US008883909B2

United States Patent
Corden et al.

(10) Patent No.: US 8,883,909 B2
(45) Date of Patent: Nov. 11, 2014

(54) GELATINOUS VIBRATION REDUCING COMPOSITION AND METHOD OF MAKING THE SAME

(75) Inventors: Tom Corden, Birmingham, MI (US); John Lane, Beverly Hills, MI (US); Andrew LaRouche, Indianapolis, IN (US)

(73) Assignee: Permawick Company, Birmingham, MI (US)

( * ) Notice: Subject to any disclaimer, the term of this patent is extended or adjusted under 35 U.S.C. 154(b) by 160 days.

(21) Appl. No.: 13/601,278

(22) Filed: Aug. 31, 2012

(65) Prior Publication Data

US 2013/0052382 A1 Feb. 28, 2013

Related U.S. Application Data

(60) Provisional application No. 61/529,585, filed on Aug. 31, 2011.

(51) Int. Cl.
| | | |
|---|---|---|
| *C08L 83/00* | (2006.01) | |
| *B01F 17/00* | (2006.01) | |
| *C08K 5/10* | (2006.01) | |
| *B60C 1/00* | (2006.01) | |
| *C08F 283/00* | (2006.01) | |
| *B29D 22/00* | (2006.01) | |
| *C08L 23/02* | (2006.01) | |

(52) U.S. Cl.
CPC .............. *C08L 23/02* (2013.01); *C08L 2205/02* (2013.01)
USPC ........... 524/506; 524/528; 524/317; 524/570; 525/506; 428/35.7

(58) Field of Classification Search
CPC .............................. C08L 23/02; C08L 2205/02
USPC .................. 524/506, 528, 317, 570; 525/506; 428/35.7
See application file for complete search history.

(56) References Cited

U.S. PATENT DOCUMENTS

| 4,380,607 A | 4/1983 | Ikeda et al. |
| 4,978,717 A | 12/1990 | Hazelton et al. |

(Continued)

FOREIGN PATENT DOCUMENTS

| EP | 1127918 B1 | 12/2006 |
| EP | 2049589 B1 | 4/2009 |

(Continued)

OTHER PUBLICATIONS

English language abstract for JP 08-188677 extracted from the PAJ database on Dec. 10, 2012, 1 page.

(Continued)

*Primary Examiner* — William Cheung
(74) *Attorney, Agent, or Firm* — Howard & Howard Attorneys PLLC

(57) ABSTRACT

A gelatinous vibration reducing composition comprises a poly-alpha-olefin component and polymeric granules. A method of forming the gelatinous vibration reducing composition comprises the steps of providing the poly-alpha-olefin component, providing the polymeric granules, and combining the poly-alpha-olefin component and the polymeric granules to form the gelatinous vibration reducing composition. A method for reducing vibration transmissivity of an article defining a cavity comprises the steps of providing a gelatinous vibration reducing composition comprising the poly-alpha-olefin component and the polymeric granules, providing the article defining the cavity, and disposing the gelatinous vibration reducing composition into the cavity of the article for reducing vibration transmissivity of the article.

26 Claims, 3 Drawing Sheets

(56) References Cited

U.S. PATENT DOCUMENTS

| | | |
|---|---|---|
| 5,157,082 A | 10/1992 | Johnson |
| 5,540,767 A | 7/1996 | Ronlan |
| 6,031,009 A | 2/2000 | Gonzalez |
| 6,599,439 B2 | 7/2003 | Iyengar et al. |
| 6,743,843 B2 | 6/2004 | Fujisawa |
| 6,811,717 B2 | 11/2004 | Iyengar et al. |
| 6,818,143 B2 | 11/2004 | Iyengar |
| 7,381,590 B2 | 6/2008 | Choudhary et al. |
| 7,413,784 B2 * | 8/2008 | Ouhadi ............ 428/36.9 |
| 7,652,101 B2 | 1/2010 | Tirelli et al. |
| 7,838,591 B2 | 11/2010 | Nakano et al. |
| 8,231,352 B2 | 7/2012 | Hunt et al. |
| 2008/0188600 A1 | 8/2008 | Westwood et al. |
| 2008/0268272 A1 | 10/2008 | Jourdain |
| 2009/0179361 A1 | 7/2009 | Vito et al. |
| 2010/0247856 A1 | 9/2010 | Vito et al. |
| 2010/0314026 A1 | 12/2010 | Donovan et al. |
| 2011/0166263 A1 | 7/2011 | Rikhoff et al. |
| 2011/0166295 A1 | 7/2011 | Bouquet et al. |

FOREIGN PATENT DOCUMENTS

| | | |
|---|---|---|
| JP | 61-243858 A | 10/1986 |
| JP | 08-188677 A | 7/1996 |

OTHER PUBLICATIONS

Machine-assisted English translation for JP 08-188677 extracted from the PAJ database on Dec. 10, 2012, 15 pages.

English language abstract for JP 61-243858 extracted from the PAJ database on Dec. 10, 2012, 1 pages.

* cited by examiner

GELATINOUS VIBRATION REDUCING COMPOSITION AND METHOD OF MAKING THE SAME

CROSS-REFERENCE TO RELATED APPLICATIONS

This application claims the benefit of U.S. Provisional Patent Application Ser. No. 61/529,585 filed on Aug. 31, 2011 and incorporated herewith in its entirety.

FIELD OF THE INVENTION

The present invention relates to a gelatinous vibration reducing composition for reducing vibration transmissivity of an article and to a method of forming the gelatinous vibration reducing composition.

DESCRIPTION OF THE RELATED ART

Articles subject to vibration, such as outdoor power equipment, power tools and sporting equipment, may transmit vibration during use to a user of the article. During occupational use, this vibration may lead to injuries to the user, such as Hand-Arm Vibration Syndrome. During recreational use, this vibration may cause fatigue or discomfort.

Vibration transmissivity of the article can have a significant impact on the amplitude of the vibrations transmitted to the user. The industry has attempted to reduce the vibration transmissivity of articles by employing vibration dampening materials, such as cross-linked silicone materials, within the articles. Cross-linked silicone material requires the step of curing after placement of the material within an article. Unfortunately, this step can be difficult based on the size and shape of the article and renders manipulation of the material after curing difficult.

Other attempts to reduce the vibration transmissivity of articles include disposing foams, rubbers, or weighted dampeners within the articles. These attempts are ineffective at reducing the vibration transmissivity of the article, have poor shape retention within the article, and/or add significant weight to the article.

As such, there remains an opportunity to provide improved vibration dampening materials.

SUMMARY OF THE INVENTION AND ADVANTAGES

The present invention provides a gelatinous vibration reducing composition. The gelatinous vibration reducing composition comprises a poly-alpha-olefin component and polymeric granules. The poly-alpha-olefin component has a kinematic viscosity of from about 2 to about 1,000,000 centistokes (cSt) at 40° C. according to ASTM D445. The poly-alpha-olefin component is present in an amount greater than about 65 parts by weight based on 100 parts by weight of the gelatinous vibration reducing composition. The polymeric granules have an average particle size of less than about 12 millimeters (mm). The gelatinous vibration reducing composition has a kinematic viscosity of from about 2 to about 1,000,000 cSt at 40° C. according to ASTM D445.

The present invention further provides a method of forming the gelatinous vibration reducing composition. The method comprises the step of providing the poly-alpha-olefin component. The method further comprises the step of providing the polymeric granules. The method yet further comprises the step of combining the poly-alpha-olefin component and the polymeric granules to form the gelatinous vibration reducing composition.

The present invention also provides a method for reducing vibration transmissivity of an article defining a cavity. The method comprises the step of providing the gelatinous vibration reducing composition. The method further comprises the step of providing the article defining the cavity. The method yet further comprises the step of disposing the gelatinous vibration reducing composition into the cavity of the article for reducing vibration transmissivity of the article.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals generally indicate like parts throughout the several views, a gelatinous vibration reducing composition is generally shown at 10. The gelatinous vibration reducing composition 10 is hereinafter simply referred to as the composition 10. The composition 10 is useful for reducing vibration transmissivity of an article 12.

The article 12 can be subject to vibration, and therefore, can transmit vibrations to a user of the article 12. The composition 10 may be disposed in the article 12, such as within a handle or a shaft of the article 12. It is to be appreciated that the composition 10 may be disposed in a support article, such as a grip or casing, with the support article disposed on and/or in the article 12 for reducing the vibration transmissivity of the article 12. Typically, the article 12 defines a cavity 14. The composition 10 is generally disposed in the cavity 14.

Examples of suitable articles 12 include outdoor power equipment, power tools, sporting equipment, home appliances, bicycles, motorcycles, automobiles, and the like. Specific examples of suitable outdoor equipment include lawn mowers, leaf blowers, string trimmers, snow blowers, trench diggers, chain saws, aerators, power rakes, cultivators, trimmers, and the like. Specific examples of suitable power tools include circular saws, hammer drills, orbital sanders, power cutters, polishers, planers, impact drivers, reciprocating saws, belt sanders, drills, routers, jig saws, and the like. Specific examples of suitable sporting equipment include hockey sticks, golf clubs, tennis racquets, lacrosse sticks, baseball and softball bats, snow and water skies, skate boards, inline skates, and the like. Specific examples of suitable home appliances include vacuum cleaners, food processors, blenders, juicers, mixers, food grinders, and the like. It is to be appreciated that the composition 10 may be used in any article 12 subject to vibration for reducing the vibration transmissivity of the article 12. As introduced above, the composition 10 can generally be disposed anywhere within the article 12.

Figure 1:
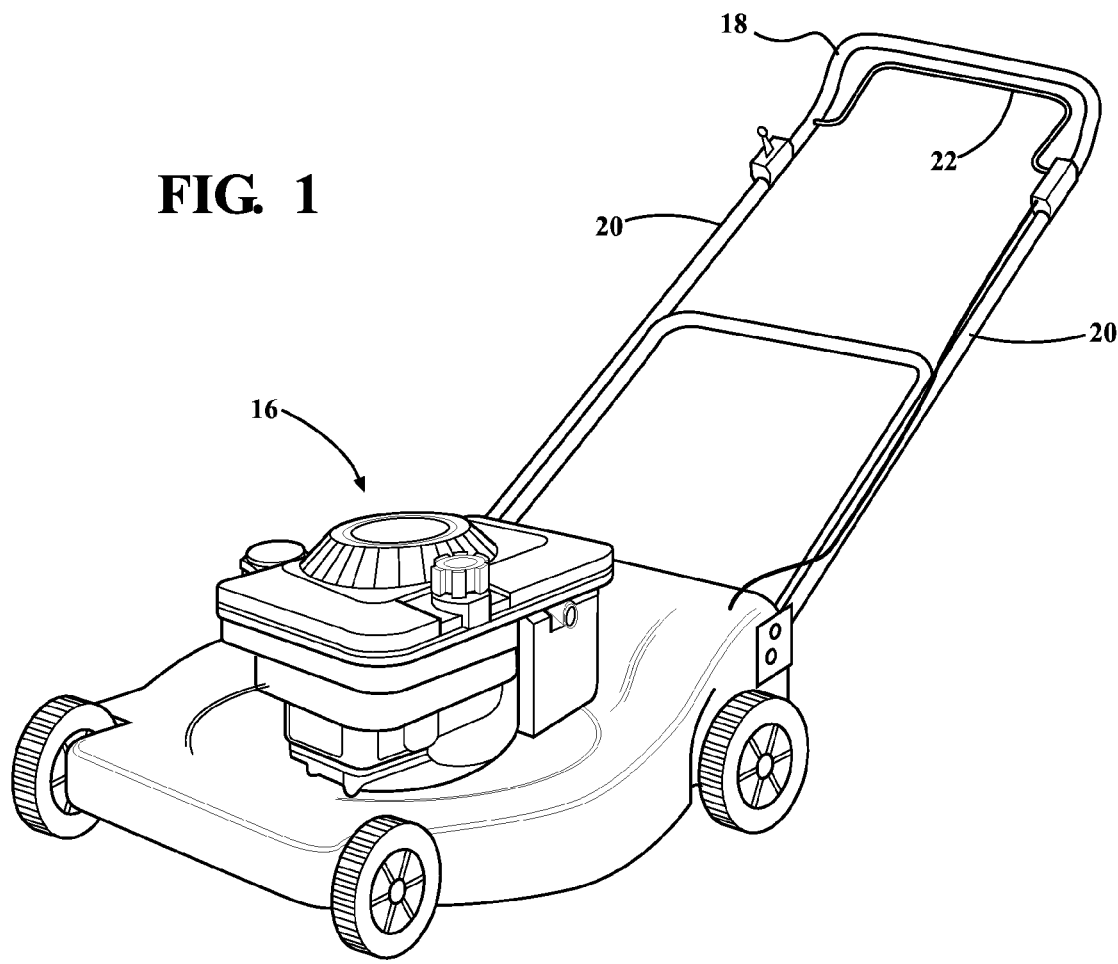
FIG. 1 is a perspective view of a lawn mower having a lawn mower handle.
Figure 2:
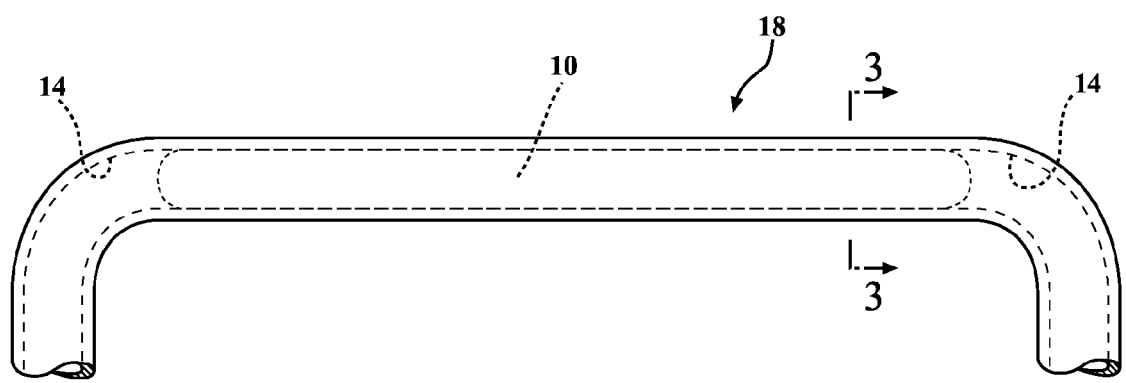
FIG. 2 is a partial front view of the lawn mower handle of FIG. 1 defining a cavity in phantom with a gelatinous vibration reducing composition disposed in the cavity.
Figure 3:
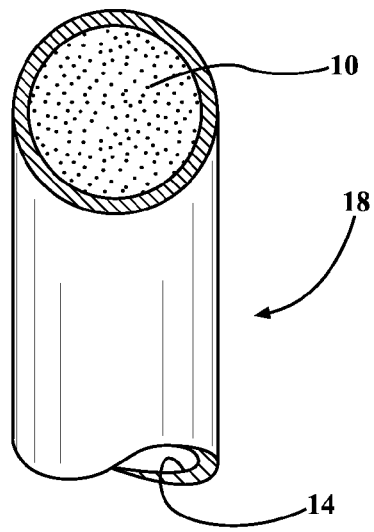
FIG. 3 is a broken cross sectional view of the lawn mower handle taken along 3-3 of FIG. 2 with the composition disposed in the cavity.

In certain embodiments, and with reference to FIGS. 1 through 3, the article 12 is a lawn mower 16. The lawn mower 16 has a handle 18 defining the cavity 14. The composition 10 is disposed in the cavity 14. The composition 10 may be disposed in any component of the lawn mower 16 defining the cavity 14, such as handle supports 20 and/or drive levers 22 of the lawn mower 16.

Figure 4:
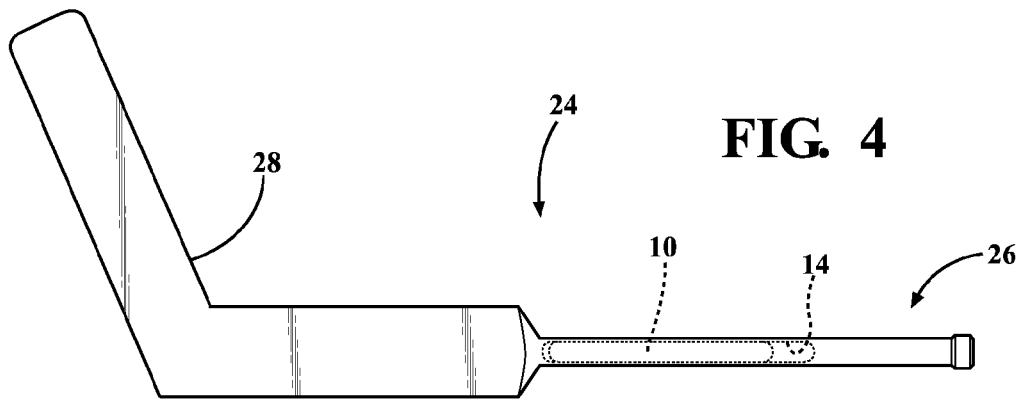
FIG. 4 is a side view of a hockey stick defining a cavity in phantom with the composition disposed in the cavity.
Figure 5:
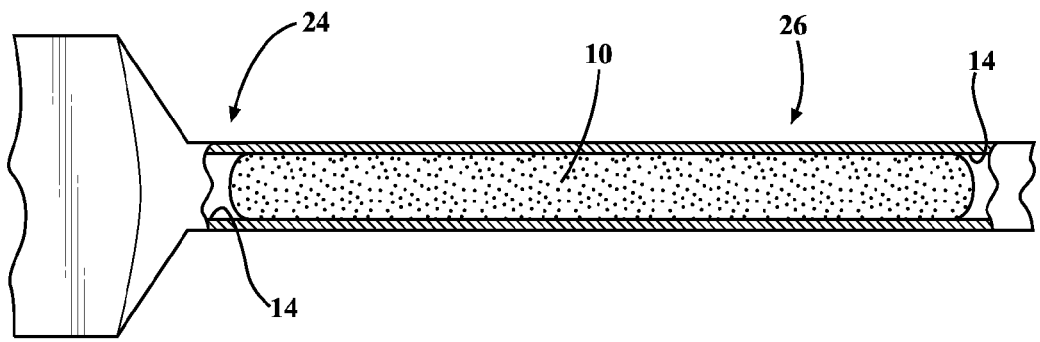
FIG. 5 is a partial broken side view of the hockey stick of FIG. 4 illustrating the composition disposed in the cavity.

In various embodiments, and with reference to FIGS. 4 and 5, the article 12 is a hockey stick 24. The hockey stick 24 has a shaft 26 defining the cavity 14. The composition 10 is disposed in the cavity 14. The composition 10 may be disposed in any portion of the hockey stick 24 defining the cavity 14, such as a blade 28 of the hockey stick 24.

Figure 6:
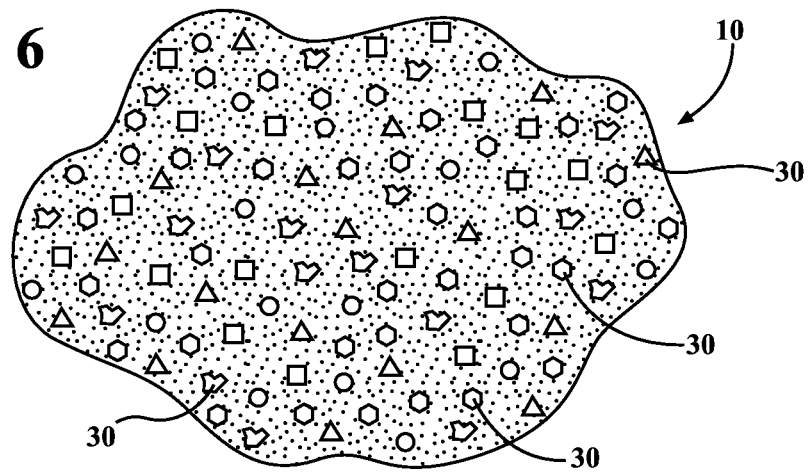
FIG. 6 is a partial magnified view of the composition comprising polymeric granules.

Referring to FIG. 6, the composition 10 comprises a carrier fluid component and polymeric granules 30. It is to be appreciated that the polymeric granules 30 depicted in FIG. 6 are exaggerated in size and shape. In certain embodiments, the composition 10 further comprises a rheological modifier and/or one or more additives. Examples of suitable additives are described and exemplified further below.

The composition 10 generally does not require curing to reduce the vibration transmissivity of the article 12. "Curing" is generally indicated by a cross-linking reaction. More specifically, the composition 10 generally does not require curing by light irradiation, heating, catalysts and/or the like to reduce the vibration transmissivity of the article 12.

The composition 10 typically has a kinematic viscosity such that the composition 10 is able to flow. The composition 10 has a kinematic viscosity of from about 2 to about 1,000,000 centistokes (cSt) at 40° C. according to ASTM D445. Alternatively, the composition 10 has a kinematic viscosity of from about 2 to about 200,000 cSt, from about 200,000 to about 450,000 cSt, from about 450,000 to about 750,000 cSt, from about 750,000 to about 1,000,000 cSt, from about 2 to about 3,000 cSt, or from about 300 to about 1,600 cSt, each at 40° C. according to ASTM D445. Alternatively, the composition 10 has a kinematic viscosity of from about 350,000 to about 550,000 cSt, from about 400,000 to about 500,000 cSt, from about 440,000 to about 480,000 cSt, or from about 450,000 to about 470,000, each at 40° C. according to ASTM D445.

Since the composition 10 is generally un-cured, the composition 10 is in a gel-like state. "Gel-like state" and "gelatinous," as used herein in reference to the composition 10, are to be interpreted as the composition 10 behaving as a liquid and a solid. More specifically, the composition 10 generally has a pseudo-thixotropic nature in which the composition 10 flows as a liquid under high stress yet behaves as a solid under low or no stress. It is to be appreciated that "gelatinous" does not imply that the composition 10 requires gelatin. The gel-like state of the composition 10 permits the composition 10 to flow into the article 12 and remain fixed in the article 12 without curing to reduce the vibration transmissivity of the article 12. If desired, manipulation of the composition 10 after fixing the composition 10 in the article is possible since the composition 10 is not generally cured.

In certain embodiments, the carrier fluid component comprises a mineral oil, a silicone, a polyolester, or combinations thereof. In related embodiments, the carrier fluid further comprises a poly-alpha-olefin in addition to the mineral oil, silicone, polyolester, or combinations thereof. In other embodiments, the carrier fluid comprises a poly-alpha-olefin excluding the mineral oil, silicone, polyolester, or combinations thereof. These embodiments are described further below. The carrier fluid component is useful as a vehicle for carrying the polymeric granules 30 and other components of the composition 10. In addition, the carrier fluid component may itself have an innate ability of reducing vibration transmissivity of the article 12.

The carrier fluid component has a kinematic viscosity of from about 2 to about 1,000,000 cSt at 40° C. according to ASTM D445. Alternatively, the carrier fluid component has a kinematic viscosity of from about 2 to about 200,000 cSt, from about 200,000 to about 450,000 cSt, from about 450,000 to about 750,000 cSt, from about 750,000 to about 1,000,000 cSt, from about 2 to about 3,000 cSt, or from about 300 to about 1,600 cSt, each at 40° C. according to ASTM D445. Alternatively, the carrier fluid component has a kinematic viscosity of from about 2 to about 100,000 cSt, from about 2 to about 10,000 cSt, from about 2 to about 5,000 cSt, from about 200 to about 2,000 cSt, or from about 300 to about 1,600 cSt, each at 40° C. according to ASTM D445. It is believed that the kinematic viscosity of the carrier fluid component contributes to the gel-like state of the composition 10.

The carrier fluid component is present in an amount greater than about 65 parts by weight based on 100 parts by weight of the composition 10. Alternatively, the carrier fluid component is present in an amount of from about 65 to about 75 parts by weight, from about 75 to about 90 parts by weight, or from about 90 to about 100 parts by weight, each based on 100 parts by weight of the composition 10. Alternatively, the carrier fluid component is present in an amount of from about 65 to about 95 parts by weight, from about 70 to about 90 parts by weight, or from about 75 to about 85 parts by weight, each based on 100 parts by weight of the composition 10. Alternatively, the carrier fluid component is present in an amount of from about 80 to about 99 parts by weight, from about 85 to about 99 parts by weight, or from about 85 to about 90 parts by weight, each based on 100 parts by weight of the composition 10.

As alluded to above, in various embodiments, the carrier fluid component is further defined as a poly-alpha-olefin component, hereinafter referred to as the PAO component. As such, the composition 10 comprises the PAO component and the polymeric granules 30. The PAO component may comprise any poly-alpha-olefin understood in the art. It is believed that the PAO component absorbs the vibrations of the article 12 thereby reducing the vibration transmissivity of the article 12.

The PAO component has a kinematic viscosity of from about 2 to about 1,000,000 cSt according to ASTM D445. Alternatively the PAO component has a kinematic viscosity of from about 2 to about 200,000 cSt, from about 200,000 to about 450,000 cSt, from about 450,000 to about 750,000 cSt, from about 750,000 to about 1,000,000 cSt, from about 2 to about 3,000 cSt, or from about 300 to about 1,600 cSt, each at 40° C. according to ASTM D445. Alternatively, the PAO component has a kinematic viscosity of from about 2 to about 100,000 cSt, from about 2 to about 10,000 cSt, from about 2 to about 5,000 cSt, from about 200 to about 2,000 cSt, or from about 300 to about 1,600 cSt, each at 40° C. according to ASTM D445.

The PAO component is present in an amount greater than about 65 parts by weight based on 100 parts by weight of the composition 10. Alternatively, the PAO component is present in an amount of from about 65 to about 75 parts by weight, from about 75 to about 90 parts by weight, or from about 90 to about 100 parts by weight, each based on 100 parts by weight of the composition 10. Alternatively, the PAO component is present in an amount of from about 65 to about 95 parts by weight, from about 70 to about 90 parts by weight, or from about 75 to about 85 parts by weight, each based on 100 parts by weight of the composition 10. Alternatively, the PAO component is present in an amount of from about 80 to about 99 parts by weight, from about 85 to about 99 parts by weight, or from about 85 to about 90 parts by weight, each based on 100 parts by weight of the composition 10.

In certain embodiments, the PAO component comprises a first poly-alpha-olefin, a second poly-alpha-olefin different from the first poly-alpha-olefin, or a combination thereof. Typically, the first poly-alpha-olefin has a kinematic viscosity different from the second poly-alpha-olefin. The first poly-alpha-olefin and the second poly-alpha-olefin may be combined to control the kinematic viscosity of the PAO component.

In various embodiments, the PAO component comprises the first poly-alpha-olefin. The first poly-alpha-olefin has a kinematic viscosity of from about 1,400 to about 1,600 cSt at 40° C. according to ASTM D445. Alternatively, the first poly-alpha-olefin has a kinematic viscosity of from about 1,400 to about 1,475 cSt, from about 1,475 to about 1,525 cSt, or from about 1,525 to about 1,600 cSt, each at 40° C. according to ASTM D445. Alternatively, the first poly-alpha-olefin has a kinematic viscosity of from about 1,425 to about 1,575 cSt, from about 1,450 to about 1,550 cSt, or from about 1,480 to about 1,520 cSt, each at 40° C. according to ASTM D445. In a specific embodiment, the first poly-alpha-olefin has a kinematic viscosity of about 1,500 cSt at 40° C. according to ASTM D445.

In other embodiments, the PAO component comprises the second poly-alpha-olefin. The second poly-alpha-olefin has a kinematic viscosity of from about 300 to about 500 cSt at 40° C. according to ASTM D445. Alternatively, the second poly-alpha-olefin has a kinematic viscosity of from about 300 to about 375 cSt, from about 375 to about 425 cSt, or from about 425 to about 500 cSt, each at 40° C. according to ASTM D445. Alternatively, the second poly-alpha-olefin has a kinematic viscosity of from about 325 to about 475 cSt, from about 350 to about 450 cSt, or from about 380 to about 420 cSt, each at 40° C. according to ASTM D445. In a specific embodiment, the second poly-alpha-olefin has a kinematic viscosity of about 396 cSt at 40° C. according to ASTM D445.

In certain embodiments, the PAO component comprises the first and the second poly-alpha-olefins. The first poly-alpha-olefin is present in an amount of from about 55 to about 75 parts by weight based on 100 parts by weight of the PAO component. Alternatively, the first poly-alpha-olefin is present in an amount of from about 55 to about 60 parts by weight, from about 60 to about 65 parts by weight, from about 65 to about 70 parts by weight, or from about 70 to about 75 parts by weight, each based on 100 parts by weight of the PAO component.

In these embodiments, the second poly-alpha-olefin is present in an amount of from about 25 to about 45 parts by weight based on 100 parts by weight of the PAO component. Alternatively, the second poly-alpha-olefin is present in an amount of from about 25 to about 30 parts by weight, from about 30 to about 35 parts by weight, from about 35 to about 40 parts by weight, or from about 40 to about 45 parts by weight, each based on 100 parts by weight of the PAO component.

Referring back to FIG. 6, the polymeric granules 30 are dispersed throughout the composition 10. The gel-like state of the composition 10 provides that the polymeric granules 30, once dispersed, generally remain dispersed throughout the composition 10. As such, the composition 10 is subject to minimal migration or settling of the polymeric granules 30 over time, either during storage or use.

The composition 10 comprising the polymeric granules 30 is more effective at reducing the vibration transmissivity of the article 12 than the composition 10 when free of the polymeric granules 30. It is believed that the polymeric granules 30 absorb the vibrations of the article 12 thereby reducing the vibration transmissivity of the article 12.

The polymeric granules 30 may comprise any polymeric material understood in the art. In certain embodiments, the polymeric granules 30 comprise crumb rubber, ground rubber, rubber granules or rubber particles. In other embodiments, the polymeric granules 30 are rubber granules. Typically, polymeric granules 30 are formed from pulverization of the polymeric material. The polymeric granules 30 may be round, square, disc shaped, regular shaped, irregular shaped or any physical shape understood in the art.

The polymeric granules 30 have an average particle size of less than about 12 millimeters (mm). Alternatively, the polymeric granules 30 have an average particle size of less than about 4 mm, less than about 1 mm, from about 0.1 to about 12 mm, from about 0.1 to about 4 mm, from about 0.5 to about 4 mm, from about 1 to 12 mm, from about 1 to about 4 mm, about 4 to about 8 mm, from about 8 to about 12 mm, from about 0.001 to about 1 mm, or from about 0.01 to about 1 mm. The polymeric granules 30 having the average particle size of less than about 1 mm are referred to herein as "dust size" polymeric granules and the polymeric granules 30 having the average particle size from about 1 mm to about 12 mm are referred to herein as "large size" polymeric granules. Typically, the dust size polymeric granules are more effective at reducing the vibration transmissivity of the article 12 relative to larger sized polymeric granules.

In certain embodiments, the polymeric granules 30 comprise a thermoset rubber, a thermoplastic elastomer, or a combination thereof. The thermoset rubber may comprise natural rubber, synthetic rubber, or a combination thereof. An example of a suitable natural rubber is polyisoprene from latex. Natural rubber may also be known as gum rubber or India rubber. Examples of suitable synthetic rubber include acrylic rubber, butadiene rubber, butyl rubber, chlorosulfonated polyethylene, ethylene propylene diene monomer, fluoroelastomers, isoprene rubber, nitrile rubber, perfluoroelastomer, polychloroprene, polysulfide rubber, silicone rubber, styrene butadiene rubber, and combinations thereof.

The thermoplastic elastomer may also be known as a thermoplastic rubber. Examples of suitable thermoplastic elastomer include styrenic block copolymers, polyolefin blends, thermoplastic vulcanizates, thermoplastic polyurethanes, thermoplastic co-polyester, thermoplastic polyamides, and combinations thereof. Typically, thermoplastic elastomers are elastic, processable, and resistant to significant creep.

The polymeric granules 30 may be vulcanized polymeric granules. Vulcanized polymeric granules are formed by vulcanization of the polymeric material. Typically, the polymeric material is subjected to a chemical process in which sulfur or other equivalent curatives cross-link polymer chains of the polymeric granules 30. Vulcanization improves properties of the polymeric granules 30, such as elasticity. The present invention is not limited to an particular method of manufacture of the polymeric granules 30.

The polymeric granules 30 may comprise a thermoplastic vulcanizate. The thermoplastic vulcanizate (TPV) is a class of thermoplastic elastomers which comprises a plastic phase and a cross-linked rubber phase. More specifically, the cross-linked rubber phase is dispersed throughout the plastic phase to form the TPV. The TPV has advantages of both rubbers and plastics, such as elasticity and processability. It is believed that the cross-linked rubber phase may contribute to the reduction of vibration transmissivity of the article 12.

The polymeric granules 30 may comprise virgin polymeric granules or recycled polymeric granules. Recycled polymeric granules, analogous to virgin polymeric granules, are typically formed from pulverization of recycled polymeric material, such as tires.

The polymeric granules 30 may comprise one or more pigments, dyes, or combinations thereof for modifying the color of the polymeric granules 30. The color may be added or already present. The polymeric granules 30 may comprise any pigments and/or dyes understood in the art. Examples of suitable pigments and/or dyes include red, green, yellow, black, orange, yellow, pink, white, blue pigments and/or dyes.

In certain embodiments, the polymeric granules 30 comprise TPV with the TPV formed from virgin polymeric material and comprising a generally red pigment and/or dye. The polymeric granules 30 of this embodiment have an average particle size of less than about 1 mm.

The polymeric granules 30 are typically present in an amount of from about 1 to about 10 part(s) by weight based on 100 parts by weight of the composition 10. Alternatively, the polymeric granules 30 are present in an amount of from about 1 to about 3 part(s) by weight, from about 3 to about 6 parts by weight, or from about 6 to about 10 parts by weight, each based on 100 parts by weight of the composition 10. Alternatively, the polymeric granules 30 are present in an amount of from about 2 to about 8 parts by weight, from about 3 to about 7 parts by weight, or from about 4 to about 6 parts by weight, each based on 100 parts by weight of the composition 10.

In embodiments wherein the carrier fluid is further defined as the PAO component and the polymeric granules 30 comprise the TPV, it is believed that the polymeric granules 30 comprising TPV cooperate with the PAO component to contribute to the gel-like state of composition 10 and minimize migration of the polymeric granules 30 in the composition 10. More specifically, it is believed that intermolecular forces, such as Van der Waals forces, between the TPV and the PAO component of the composition 10 contribute to the pseudo-thixotropic nature of the composition 10. It is to be appreciated that the polymeric granules 30 comprising any thermoplastic elastomer may contribute to the gel-like state of the composition 10.

In certain embodiments, the composition 10 further comprises a rheological modifier. The rheological modifier may comprise one or more silicas. The silica may comprise any silica understood in the art. Examples of suitable silicas include fused quartz, crystal silica, fumed silica, colloidal silica, silica gel, aerogel silica, and combinations thereof.

In certain embodiments, the rheological modifier comprises fumed silica. In certain specific embodiments, the fumed silica includes a surface treatment. In various embodiments, the surface treatment is formed from and/or comprises a polydimethylsiloxane (PDMS). The polydimethylsiloxane imparts hydrophobic properties to the composition 10. These hydrophobic properties generally improve durability of the composition 10 in articles 12 which may be subject to moisture, such as outdoor power equipment.

If utilized, the rheological modifier is useful as a thickener for the composition 10. Typically, the rheological modifier greatly increases the pseudo-thixotropic nature of the composition 10 thereby enhancing the gel-like state of the composition 10. Therefore, enhancement by the rheological modifier of the gel-like state of the composition 10 further fixes the composition 10 in the article 12 and further minimizes migration of the polymeric granules 30 in the composition 10.

If utilized, the rheological modifier is present in an amount of from about 1 to about 20 part(s) by weight based on 100 parts by weight of the composition 10. Alternatively, the rheological modifier is present in an amount of from about 1 to about 5 part(s) by weight, from about 5 to about 10 parts by weight, from about 10 to about 15 parts by weight, or from about 15 to about 20 parts by weight, each based on 100 parts by weight of the composition 10.

The composition 10 may further comprise one or more additives. The one or more additives comprise any additive understood in the art. Examples of suitable additives include anti-oxidants, metal deactivators, rust inhibitors, and combinations thereof. The additives are useful for maintaining the stability, preserving and protecting the composition 10.

The composition 10 may further comprise an anti-oxidant. If utilized, the anti-oxidant is present in an amount of from about 0.01 to about 1 part(s) by weight based on 100 parts by weight of the composition 10. Alternatively, the anti-oxidant is present in an amount of from about 0.01 to about 0.1 parts by weight, from about 0.1 to about 0.3 parts by weight, from about 0.3 to about 0.6 parts by weight, or from about 0.6 to about 1 part(s) by weight, each based on 100 parts by weight of the composition 10. Alternatively, the anti-oxidant is present in an amount of from about 0.1 to about 0.6 parts by weight, from about 0.1 to about 0.5 parts by weight, or from about 0.2 to about 0.4 parts by weight, each based on 100 parts by weight of the composition 10.

The composition 10 may further comprise a metal deactivator. If utilized, the metal deactivator is present in an amount of from about 0.01 to about 1 part(s) by weight based on 100 parts by weight of the composition 10. Alternatively, the metal deactivator is present in an amount of from about 0.01 to about 0.1 parts by weight, from about 0.1 to about 0.3 parts by weight, from about 0.3 to about 0.6 parts by weight, or from about 0.6 to about 1 part(s) by weight, each based on 100 parts by weight of the composition 10. Alternatively, the metal deactivator is present in an amount of from about 0.01 to about 0.07 parts by weight, from about 0.02 to about 0.06 parts by weight, or from about 0.03 to about 0.05 parts by weight, each based on 100 parts by weight of the composition 10.

The composition 10 may further comprise a rust inhibitor. If utilized, the rust inhibitor is present in an amount of from about 0.01 to about 1 part(s) by weight based on 100 parts by weight of the composition 10. Alternatively, the rust inhibitor is present in an amount of from about 0.01 to about 0.1 parts by weight, from about 0.1 to about 0.3 parts by weight, from about 0.3 to about 0.6 parts by weight, or from about 0.6 to about 1 part(s) by weight, each based on 100 parts by weight of the composition 10. Alternatively, the rust inhibitor is present in an amount of from about 0.01 to about 0.07 parts by weight, from about 0.02 to about 0.06 parts by weight, or from about 0.03 to about 0.05 parts by weight, each based on 100 parts by weight of the composition 10. Alternatively, the rust inhibitor is present in an amount of from about 0.1 to about 0.7 parts by weight, from about 0.2 to about 0.6 parts by weight, or from about 0.3 to about 0.5 parts by weight, each based on 100 parts by weight of the composition 10.

In various embodiments, the composition 10 is substantially free from polyols. "Substantially free," as used herein in reference to polyols, is to be interpreted as free from any polyols discretely added to the composition 10. More specifically, the composition 10 may comprise polyols in an amount less than 2 parts by weight, less than 1 part by weight, or 0 parts by weight, each based on 100 parts by weight of the composition 10 without departing from the definition of substantially free from polyols. In addition, the term "polyol," as used herein and throughout the art, is defined as any organic compound having at least three hydroxyl functional groups (—OH) per molecule.

The present invention also provides a method of forming the composition 10. The composition 10 may be formed by any conventional method understood in the art. Typically, the composition 10 is formed using a mixer. As described in detail below, components of the composition 10 are provided and combined to form the composition 10. Each component may be added to the mixer at various times, in various combinations, and various orders of the additives.

The method comprises the step of providing the PAO component. As described above, the PAO component may comprise one or more poly-alpha-olefins. Although not necessary, in embodiments where the PAO component comprises two or more poly-alpha-olefins, the PAO component may be mixed to combine the two or more poly-alpha-olefins. Such mixtures may be formed beforehand or in situ.

The method further comprises the step of providing the polymeric granules 30. As described above, the polymeric granules 30 may comprise any polymeric material understood in the art. In various embodiments, the polymeric granules 30 comprise a thermoplastic elastomer such as TPV.

The method yet further comprises the step of combining the PAO component and the polymeric granules 30 to form composition 10. In certain embodiments, the method further comprises the steps of providing the rheological modifier and/or the one or more additives, and combining the PAO component, the polymeric granules 30, the rheological modifier, and/or the one or more additives to form the composition 10.

In other embodiments of forming the composition 10, the method comprises the step of providing the carrier fluid. The method further comprises the step of providing the polymeric granules 30. The method yet further comprises the step of combining the carrier fluid component and the polymeric granules 30 to form the composition 10.

In various embodiments, the method further comprises the steps of providing the rheological modifier and/or the one or more additives, and combining the carrier fluid component, the polymeric granules 30, the rheological modifier, and/or the one or more additives to form the composition 10.

Figure 7:
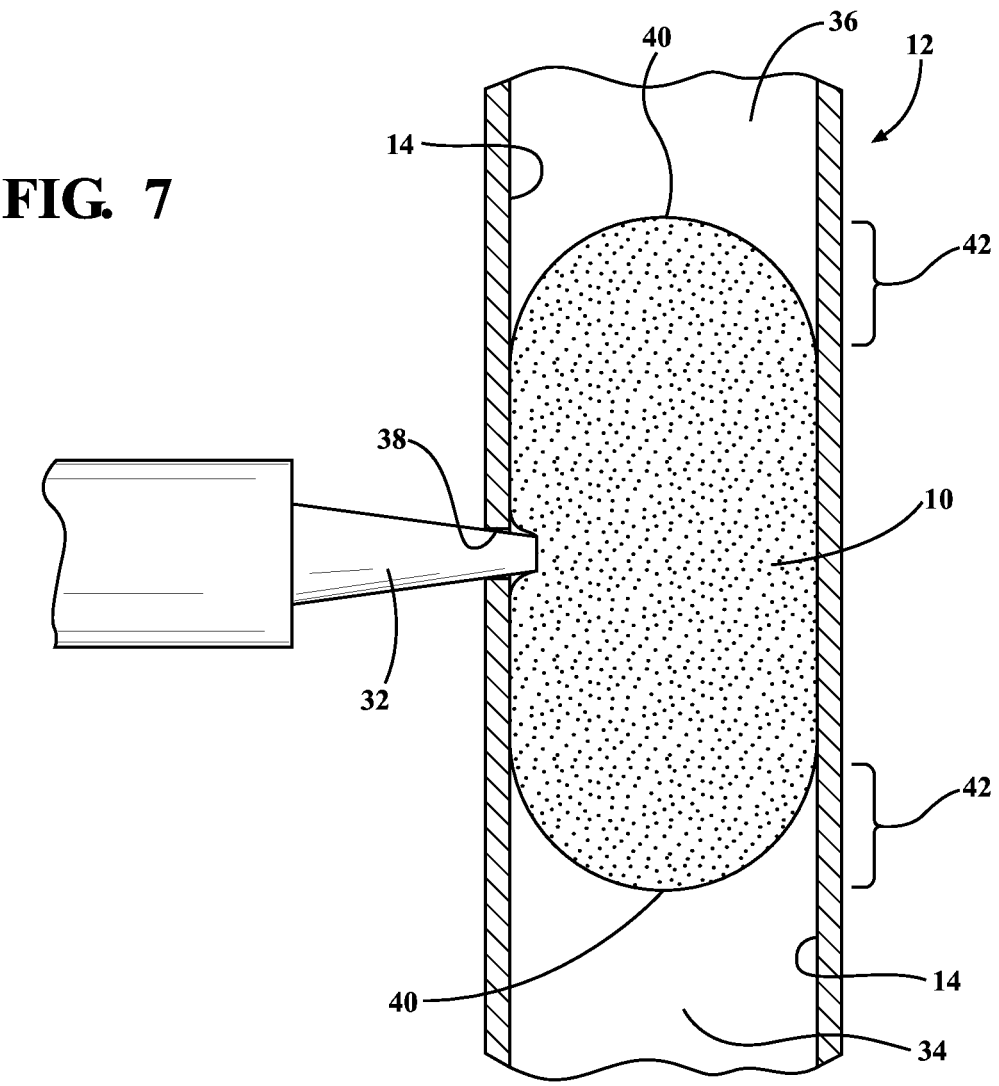
FIG. 7 is a partial cross sectional side view of an article defining a cavity with the composition being disposed in the cavity by an injection apparatus.

Referring to FIG. 7, the present invention provides a method for reducing vibration transmissivity of an article 12 defining a cavity 14. The method comprises the step of providing the composition 10. The method further comprises the step of providing the article 12 defining the cavity 14. Examples of suitable articles 12, as described above, include outdoor power equipment, power tools, sporting equipment, home appliances, bicycles, motorcycles, automobiles, and the like. The method yet further comprises the step of disposing the composition 10 into the cavity 14 of the article 12 for reducing vibration transmissivity of the article 12. The composition 10 may be disposed into the cavity 14 by any conventional method and/or injection apparatus 32 understood in the art. Examples of suitable methods and/or injection apparatuses 32 for disposing the composition 10 include squeeze tubes, traditional and pneumatic caulking guns, pneumatic pumps, and single and duel pail injection machines. Typically, the pneumatic pumps and pail injection machines include the injection apparatus 32 for disposing the composition 10 into the cavity 14.

In various embodiments, the cavity 14 of the article 12 has a first end 34 and a second end 36 spaced from the first end 34 with a length extending from the first end 34 to the second end 36. A hole 38 is defined in within the article 12 between the first end 34 and the second end 36 which is in fluid communication to the cavity 14. The step of disposing the composition 10 may be further defined as injecting the composition 10 into the cavity 14 of the article 12 such that the composition 10 fills the cavity 14 between the first end 34 and the second end 36. More specifically, the composition 10 is injected through the hole 38 into the cavity 14 between the first end 34 and the second end 36. It is to be appreciated the cavity 14 may have one or more ends in addition to the first end 34 and the second end 36, such as a third end, a forth end, etc. As such, the composition 10 may fill the cavity 14 between the one or more ends in addition to the first end 34 and the second end 36.

In other embodiments, the step of disposing the composition 10 is further defined as injecting the composition 10 and fixing the composition 10 in the cavity 14 of the article 12. As described above, the composition 10 is in a gel-like state. As such, the composition 10 is fixed in the cavity 14 of the article 12. "Fixing" and "fixed" as used herein in reference to the composition 10, are to be interpreted as the composition 10 rendered not readily movable in the cavity 14 without departing from the definition of fixing the composition 10 in the cavity 14 of the article 12. It is to be appreciated that although the composition 10 is rendered not readily movable in the cavity 14, the composition 10 may vibrate in the cavity 14.

In certain embodiments, the cavity 14 of the article 12 has the first end 34 and the second end 36 spaced from the first end 34 with a length extending from the first end 34 to the second end 36. The step of fixing the composition 10 is further defined as fixing the composition 10 between the first end 34 and the second end 36 of the cavity 14. As such, the composition 10 remains fixed in the cavity 14 of the article 12 between the first end 34 and the second end 36.

"Fixing" and "fixed" as used herein in reference to the composition 10, are to be interpreted as the composition 10 rendered not readily movable in the cavity 14 between the first end 34 and the second end 36 of the article 12. More specifically, the composition 10 may not move more than 5 percent, not move more than 2.5 percent, or not move more than 0 percent, each based on 100 percent of the length extending from the first end 34 and the second end 36 without departing from the definition of fixing the composition 10 between the first end 34 and the second end 36 of the cavity 14. It is to be appreciated that although the composition 10 is rendered not readily movable in the cavity 14, the composition 10 may vibrate in the cavity 14.

Typically, the composition 10 in the cavity 14 of the article 12 has one or more leading edges 40 adjacent to the first end 34 and the second end 36 of the cavity 14. During injection of the composition 10, the composition 10 extends from the hole 38 to the first end 34 and the second end 36 along the length with the one or more leading edges 40 adjacent to the first end 34 and the second end 36. After fixing the composition 10, the composition 10 has one or more leading edges 40 adjacent to the first end 34 and the second end 36. The one or more leading edges 40 may have any conventional fluid form. Examples of conventional fluid forms include linear, convex, concave, and the like. The one or more leading edges 40 are within a variance distance 42 corresponding to the fluid forms. Accordingly, the composition 10 is injected through the hole 38 into the cavity 14 between the first end 34 and the second end 36 with the one or more leading edges 40 within the variance distance 42. After fixing the composition 10 between the first end 34 and the second end 36 of the cavity 14, the composition 10 is fixed with the one or more leading edges 40 within the variance distance 42.

The following examples, illustrating the composition 10, methods, and articles 12 of the present invention, are intended to illustrate and not to limit the invention.

EXAMPLES

Table I below illustrates examples of the composition prepared by adding the following parts by weight using the method of forming the composition, as described above. All amounts are in parts by weight based on 100 parts by weight of the composition, unless otherwise indicated.

TABLE I

| Component | Example 1 | Example 2 | Example 3 | Example 4 | Example 5 | Example 6 |
|---|---|---|---|---|---|---|
| First PAO | 63.32 | 60.15 | 60.15 | 55.67 | 51.47 | — |
| Second PAO | 36.68 | 34.85 | 34.85 | 32.25 | 29.45 | 80.70 |
| Fumed Silica | — | — | — | 6.65 | — | — |
| Surface Treated Fumed Silica | — | — | — | — | 13.30 | 15.52 |
| Large Size Polymeric Granules | — | 5 | — | — | — | — |
| Dust Size Polymeric Granules | — | — | 5 | 5 | 5 | 3 |
| Anti-Oxidant Additive | — | — | — | 0.35 | 0.33 | 0.33 |
| Metal Deactivator Additive | — | — | — | 0.04 | 0.04 | 0.04 |
| Rust Inhibitor Additive I | — | — | — | 0.04 | — | — |
| Rust Inhibitor Additive II | — | — | — | — | 0.41 | 0.41 |
| TOTAL | 100 | 100 | 100 | 100 | 100 | 100 |

In the Table above, Example 1 is a comparative example. Examples 2 through 6 are invention examples.

The First PAO is a poly-alpha-olefin having a high viscosity index and a low pour point. More specifically, the First PAO has a viscosity index of about 218 according to ASTM D2270, a pour point of about −33° C. according to ASTM D5950/D97, and a specific gravity at 15.6° C. of about 0.850 according to ASTM D4052. In addition, the First PAO has a kinematic viscosity of about 150 cSt at 100° C., of about 1,500 cSt at 40° C., and of about 18,000 cSt at 0° C., each according to ASTM D445. Furthermore, the First PAO has a brookfield viscosity of about 14,860 centipoise at 0° C. and of about 128,000 centipoise at −20° C., each according to ASTM D2983.

The Second PAO is a poly-alpha-olefin having a high viscosity. More specifically, the Second PAO has a viscosity index of about 147 according to ASTM D2270, a pour point of about −36° C. according to ASTM D5950/D97, and a specific gravity at 15.6° C. of about 0.850 according to ASTM D4052. In addition, the Second PAO has a kinematic viscosity of about 39 cSt at 100° C., of about 396 cSt at 40° C., of about 4,840 cSt at 0° C., and of about 40,500 cSt at −20° C., each according to ASTM D445. Furthermore, the Second PAO has a brookfield viscosity of about 102,000 centipoise at −26° C. according to ASTM D2983.

The Fumed Silica has an average particle size of from about 0.2 to about 0.3 microns and an oil absorption of about 350 grams per 100 grams of oil.

The Surface Treated Fumed Silica is treated with polydimethylsiloxane (PDMS).

The Large Size Polymeric Granules comprise TPV, have an average particle size of from about 1 mm to about 12 mm.

The Dust Size Polymeric Granules comprise TPV, have an average particle size of less than about 1 mm.

The Anti-Oxidant Additive comprises a octylated/butylated diphenylamine.

The Metal Deactivator Additive comprises a tolutriazole derivative.

The Rust Inhibitor Additive I comprises succinic acid half ester.

The Rust Inhibitor Additive II comprises a calcium based sulfonate in PAO wherein the calcium based sulfonate is present in an amount of about 1.7 parts by weight based on 100 parts by weight of the PAO.

Selected examples of the composition are disposed in the cavity of the article with each article evaluated for vibration transmissivity. The articles having the composition are compared to the same article free of the composition to determine the reduction of vibration transmissivity of the article. The articles evaluated include a hollow aluminum rod, a lawn mower handle, a hockey stick, a bike handle bar, a tennis racket handle, and a line trimmer shaft. Results for the reduction of vibration transmissivity of the hollow aluminum rod, the lawn mower handle, and the hockey stick are described below.

Methods for evaluating the reduction of vibration transmissivity of the article and corresponding results are also described in detail below. The hollow aluminum rod is evaluated for vibration transmissivity using a method comprising the step of providing the Example 1, Example 2 or Example 3 composition, the hollow aluminum rod having a first and second end opposite each other with a cavity defined between the ends, two shear-type accelerometers, an impact hammer, and data processing equipment. The method further comprises the step of disposing about 100 grams of the composition in each end of the cavity of the hollow aluminum. The method also comprises the step of suspending the hollow aluminum rod. The method further comprises the step of coupling the accelerometers to the hollow aluminum rod. The method also comprises the step of impacting the hollow aluminum rod with the impact hammer. Finally, the method comprises the step of recording vibration amplitudes at a plurality of dominant frequencies with the data processing equipment.

The lawn mower handle is evaluated for vibration transmissivity using a method comprising the step of providing the Example 4 composition, a lawn mower having an engine and the lawn mower handle with the lawn mower handle having a first and second end spaced from each other with a cavity defined between the ends, four shear-type accelerometers, an impact hammer, and data processing equipment. The method further comprises the step of disposing about 30 grams of the composition in the cavity of the lawn mower handle between the first and second ends. The method also comprises the step of suspending the lawn mower handle or coupling the lawn mower handle to the lawn mower. The method further comprises the step of attaching the four accelerometers to the lawn mower handle spaced from each other between the first and second ends. The method also comprises the step of impacting the lawn mower handle with the impact hammer or running the engine of the lawn mower. Finally, the method comprises the step of recording vibration amplitudes at a plurality of dominant frequencies with the data processing equipment.

The hockey stick is evaluated for vibration transmissivity using a method comprising the step of providing the Example 4 composition, the hockey stick having a blade and a shaft with the shaft having a first end adjacent to the blade and a second end opposite the first end with a cavity defined between the ends, four shear-type accelerometers, an impact hammer with force transducer, and data processing equipment. The method further comprises the step of disposing about 20 grams of the composition in the cavity of the shaft at a first position, at a second position, or at a third position. The method also comprises the step of suspending the hockey stick at the blade and the shaft. The method further comprises the step of attaching the four accelerometers adjacent the first end with two of the accelerometers on the blade and two of the accelerometers on the shaft. The method also comprises the step of impacting the blade of the hockey stick. Finally, the method comprises the step of recording vibration amplitudes at a plurality of dominant frequencies with the data processing equipment.

The results for the reduction of vibration transmissivity of the articles having the composition compared to the articles free of the composition are described below. Vibration amplitudes are recorded for over dominant frequencies for all accelerometers for each article evaluated. These vibration amplitudes are averaged for each article evaluated to determine the reduction of vibration transmissivity of the article. The reduction of vibration transmissivity is calculated as follows:

1−(average vibration amplitude for the article having the composition/average vibration amplitude for the article free of composition)×100.

As illustrated in Table II, the hollow aluminum rod having the composition comprising dust sized polymeric granules (Example 3) has a reduction of vibration transmissivity of about 93 percent which is greater than the hollow aluminum rod having the composition free of polymeric granules (Example 1) and much greater than the composition comprising large sized polymeric granules (Example 2).

The lawn mower handle and the hockey stick having the composition comprising the dust sized polymeric granules, the fumed silica, and the additives have a reduction of vibration transmissivity of from about 20 to about 92 percent. Based on the results, the composition is effective at reducing the vibration transmissivity of various articles. The effectiveness of the reduction of vibration transmissivity generally is dependent on the article, position of the composition within the article, and vibration source.

TABLE II

| Article | Composition | Vibration Source | Reduction of Vibration Transmissivity[1] |
|---|---|---|---|
| Hollow Aluminum Rod | Example 1 | Impact Hammer | ~86% |
| Hollow Aluminum Rod | Example 2 | Impact Hammer | ~14% |
| Hollow Aluminum Rod | Example 3 | Impact Hammer | ~93% |
| Lawn Mower Handle | Example 4 | Impact Hammer | ~92% |
| Lawn Mower Handle | Example 4 | Engine | ~20% |
| Hockey Stick (First Position) | Example 4 | Impact Hammer | ~41% |
| Hockey Stick (Second Position) | Example 4 | Impact Hammer | ~68% |
| Hockey Stick (Third Position) | Example 4 | Impact Hammer | ~57% |

[1]Vibration amplitudes are recorded for over dominant frequencies for all accelerometers for each article evaluated. These vibration amplitudes are averaged for each article evaluated.

The average vibration amplitude for each article having the composition is compared to the average vibration amplitude for each article free of the composition to determine the reduction of vibration transmissivity of the article.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The invention may be practiced otherwise than as specifically described within the scope of the appended claims. The subject matter of all combinations of independent and dependent claims, both singly and multiply dependent, is herein expressly contemplated.

What is claimed is:

1. A gelatinous vibration reducing composition comprising:
    a poly-alpha-olefin component having a kinematic viscosity of from about 2 to about 1,000,000 centistokes (cSt) at 40° C. according to ASTM D445; and
    polymeric granules having an average particle size of less than 12 millimeters (mm);
    wherein said poly-alpha-olefin component is present in an amount greater than about 65 parts by weight based on 100 parts by weight of said gelatinous vibration reducing composition; and
    wherein said gelatinous vibration reducing composition has a kinematic viscosity of from about 2 to about 1,000,000 cSt at 40° C. according to ASTM D445.

2. A gelatinous vibration reducing composition as set forth in claim 1 wherein said gelatinous vibration reducing composition is substantially free of polyols.

3. A gelatinous vibration reducing composition as set forth in claim 1 wherein said poly-alpha-olefin component comprises a first poly-alpha-olefin, a second poly-alpha-olefin different from said first poly-alpha-olefin, or a combination thereof.

4. A gelatinous vibration reducing composition as set forth in claim 3 wherein;
    said first poly-alpha-olefin has a kinematic viscosity of from about 1,400 to about 1,600 cSt at 40° C.,
    and said second poly-alpha-olefin has a kinematic viscosity of from about 300 to about 500 centistokes (cSt) at 40° C., each according to ASTM D445.

5. A gelatinous vibration reducing composition as set forth in claim 3 wherein;
    said first poly-alpha-olefin is present in an amount of from about 55 to about 75 parts by weight, and
    said second poly-alpha-olefin is present in an amount of from about 25 to about 45 parts by weight, each based on 100 parts by weight of said poly-alpha-olefin component.

6. A gelatinous vibration reducing composition as set forth in claim 3 wherein;
    said poly-alpha-olefin component comprises said first and said second poly-alpha-olefins;
    said first poly-alpha-olefin has a kinematic viscosity of from about 1,400 to about 1,600 cSt at 40° C. according to ASTM D445 and is present in an amount of from about 55 to about 75 parts by weight based on 100 parts by weight of said poly-alpha-olefin component, and
    said second poly-alpha-olefin has a kinematic viscosity of from about 300 to about 500 cSt at 40° C. according to ASTM D445 and is present in an amount of from about 25 to about 45 parts by weight based on 100 parts by weight of said poly-alpha-olefin component.

7. A gelatinous vibration reducing composition as set forth in claim 1 wherein said polymeric granules comprise a thermoplastic elastomer.

8. A gelatinous vibration reducing composition as set forth in claim 7 wherein said thermoplastic elastomer comprises a thermoplastic vulcanizate.

9. A gelatinous vibration reducing composition as set forth in claim 1 wherein said polymeric granules are present in an amount of from about 1 to about 10 part(s) by weight based on 100 parts by weight of said gelatinous vibration reducing composition.

10. A gelatinous vibration reducing composition as set forth in claim 1 further comprising a rheological modifier.

11. A gelatinous vibration reducing composition as set forth in claim 10 wherein said rheological modifier comprises fumed silica.

12. A gelatinous vibration reducing composition as set forth in claim 11 wherein said fumed silica includes a surface treatment comprising a polydimethylsiloxane.

13. A gelatinous vibration reducing composition as set forth in claim 10 wherein said rheological modifier is present in an amount of from about 1 to about 20 part(s) by weight based on 100 parts by weight of said gelatinous vibration reducing composition.

14. A gelatinous vibration reducing composition as set forth in claim 1 wherein:
    said gelatinous vibration reducing composition;
        is substantially free of polyols, and
        further comprises a rheological modifier; and
    said polymeric granules comprise a thermoplastic elastomer.

15. A gelatinous vibration reducing composition as set forth in claim 1 further comprising an anti-oxidant present in an amount of from about 0.01 to about 1 part(s) by weight based on 100 parts by weight of said gelatinous vibration reducing composition.

16. A gelatinous vibration reducing composition as set forth in claim 1 further comprising a metal deactivator present in an amount of from about 0.01 to about 1 part(s) by weight based on 100 parts by weight of said gelatinous vibration reducing composition.

17. A gelatinous vibration reducing composition as set forth in claim 1 further comprising a rust inhibitor present in an amount of from about 0.01 to about 1 part(s) by weight based on 100 parts by weight of said gelatinous vibration reducing composition.

18. An article defining a cavity and comprising said gelatinous vibration reducing composition as set forth in claim 1 with said gelatinous vibration reducing composition disposed in said cavity.

19. A method of forming a gelatinous vibration reducing composition, said method comprising the steps of:
    providing a poly-alpha-olefin component having a kinematic viscosity of from about 2 to about 1,000,000 centistokes (cSt) at 40° C. according to ASTM D445;
    providing polymeric granules having an average particle size of less than 12 millimeters (mm); and
    combining the poly-alpha-olefin component and the polymeric granules to form the gelatinous vibration reducing composition such that the poly-alpha-olefin component is present in an amount greater than about 65 parts by weight based on 100 parts by weight of the gelatinous vibration reducing composition;
    wherein the gelatinous vibration reducing composition has a kinematic viscosity of from about 2 to about 1,000,000 cSt at 40° C. according to ASTM D445.

20. A method for reducing vibration transmissivity of an article defining a cavity, said method comprising the steps of:
   providing a gelatinous vibration reducing composition comprising;
      a poly-alpha-olefin component having a kinematic viscosity of from about 2 to about 1,000,000 centistokes (cSt) at 40° C. according to ASTM D445, and
      polymeric granules having an average particle size of less than 12 millimeters (mm),
      wherein the poly-alpha-olefin component is present in an amount greater than about 65 parts by weight based on 100 parts by weight of the gelatinous vibration reducing composition; and
      wherein the gelatinous vibration reducing composition has a kinematic viscosity of from about 2 to about 1,000,000 cSt at 40° C. according to ASTM D445;
   providing the article defining the cavity; and
   disposing the gelatinous vibration reducing composition into the cavity of the article for reducing vibration transmissivity of the article.

21. A method as set forth in claim 20 wherein the cavity has a first end and a second end spaced from the first end with a length extending from the first end to the second end; and
   wherein the step of disposing the gelatinous vibration reducing composition is further defined as injecting the gelatinous vibration reducing composition into the cavity of the article such that the gelatinous vibration reducing composition fills the cavity between the first and second ends.

22. A method as set forth in claim 20 wherein the gelatinous vibration reducing composition is in a gel-like state and wherein the step of disposing the gelatinous vibration reducing composition is further defined as injecting the gelatinous vibration reducing composition and fixing the gelatinous vibration reducing composition in the cavity of the article.

23. A method as set forth in claim 22 wherein the cavity has a first end and a second end spaced from the first end with a length extending from the first end to the second end; and
   wherein the step of fixing the gelatinous vibration reducing composition is further defined as fixing the gelatinous vibration reducing composition between the first and second ends of the cavity.

24. A gelatinous vibration reducing composition comprising:
   a poly-alpha-olefin component having a kinematic viscosity of from about 2 to about 1,000,000 centistokes (cSt) at 40° C. according to ASTM D445 comprising;
      a first poly-alpha-olefin having a kinematic viscosity of from about 1,400 to about 1,600 cSt at 40° C., and
      a second poly-alpha-olefin different from said first poly-alpha-olefin and having a kinematic viscosity of from about 300 to about 500 centistokes (cSt) at 40° C., each according to ASTM D445; and
   polymeric granules having an average particle size of less than 12 millimeters (mm);
   wherein said poly-alpha-olefin component is present in an amount greater than about 65 parts by weight based on 100 parts by weight of said gelatinous vibration reducing composition; and
   wherein said gelatinous vibration reducing composition has a kinematic viscosity of from about 2 to about 1,000,000 cSt at 40° C. according to ASTM D445.

25. A gelatinous vibration reducing composition as set forth in claim 24 wherein;
   said first poly-alpha-olefin is present in an amount of from about 55 to about 75 parts by weight, and
   said second poly-alpha-olefin is present in an amount of from about 25 to about 45 parts by weight, each based on 100 parts by weight of said poly-alpha-olefin component.

26. An article defining a cavity with a gelatinous vibration reducing composition disposed in said cavity, said gelatinous vibration reducing composition comprising:
   a poly-alpha-olefin component having a kinematic viscosity of from about 2 to about 1,000,000 centistokes (cSt) at 40° C. according to ASTM D445; and
   polymeric granules having an average particle size of less than 12 millimeters (mm);
   wherein said poly-alpha-olefin component is present in an amount greater than about 65 parts by weight based on 100 parts by weight of said gelatinous vibration reducing composition; and
   wherein said gelatinous vibration reducing composition has a kinematic viscosity of from about 2 to about 1,000,000 cSt at 40° C. according to ASTM D445.

* * * * *